United States Patent
Wang et al.

(10) Patent No.: US 10,234,972 B2
(45) Date of Patent: Mar. 19, 2019

(54) TOUCH DISPLAY PANEL ALTERNATELY EXECUTING A DISPLAY MODE AND A TOUCH MODE AND CONTROL METHOD THEREOF

(71) Applicant: AU Optronics Corporation, Hsin-chu (TW)

(72) Inventors: Yi-Chun Wang, Hsin-chu (TW); Pi-Chun Yeh, Hsin-chu (TW); Hsin-Chun Huang, Hsin-chu (TW); Ching-Sheng Cheng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/466,406

(22) Filed: Mar. 22, 2017

(65) Prior Publication Data
US 2017/0277318 A1    Sep. 28, 2017

(30) Foreign Application Priority Data
Mar. 23, 2016 (TW) .............................. 105108999 A (51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ............... G06F 3/0412; G02F 1/1323; G09G 2320/068; G09G 2320/028; G09G 3/3655
See application file for complete search history.

(56) References Cited

U.S. PATENT DOCUMENTS 7,667,808 B2 * 2/2010 Yamashita ........ G02F 1/134363
349/139
9,746,706 B2 * 8/2017 Matsushima ....... G02F 1/13338
(Continued)

FOREIGN PATENT DOCUMENTS

CN    104730747 A    6/2015
CN    105118415 A    12/2015

OTHER PUBLICATIONS

Office Action issued by the State Intellectual Property Office of the Peoples Republic of China dated Jun. 19, 2018 for Application No. CN201610321952.2.

*Primary Examiner* — Xuemei Zheng
(74) *Attorney, Agent, or Firm* — Tim Tingkang Xia, Esq.; Locke Lord LLP (57) ABSTRACT

A touch display panel and controlling method thereof are provided. The touch display panel includes a first substrate, a second substrate, a display medium layer, a first common electrode, and a pixel structure including a pixel electrode and a second common electrode. The first common electrode has a voltage signal. In a display mode, the pixel electrode is provided with a data signal so that a first voltage difference exists between the first and the second common electrodes. The arrangement of the display medium layer varies according to the data signal and the first voltage difference. In a touch mode, the second common electrode is provided with an indication signal whose waveform alternates between first and second voltage values. When the indication signal is at the first voltage value and a second voltage value respectively, a second and a third voltage differences exist between the first and second common electrodes.

7 Claims, 8 Drawing Sheets

(51) Int. Cl.
  *G02F 1/1333* (2006.01)
  *G09G 3/36* (2006.01)
  *G09G 3/20* (2006.01)

(52) U.S. Cl.
  CPC ......... *G09G 3/2092* (2013.01); *G09G 3/3655* (2013.01); *G09G 2320/028* (2013.01); *G09G 2320/068* (2013.01); *G09G 2358/00* (2013.01)

(56) References Cited

U.S. PATENT DOCUMENTS

2014/0118639 A1\* 5/2014 Matsushima ....... G02F 1/13338
  349/12
2014/0333572 A1 11/2014 Hu \* cited by examiner

TOUCH DISPLAY PANEL ALTERNATELY EXECUTING A DISPLAY MODE AND A TOUCH MODE AND CONTROL METHOD THEREOF

CROSS-REFERENCE TO RELATED PATENT APPLICATION

This application claims the benefit of priority to Taiwan Patent Application No. 105108999, filed Mar. 23, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a touch display panel and a control method thereof, and more particularly to a touch display panel and a control method thereof where a voltage difference exists between a first common electrode and a second common electrode in a display mode or a touch mode.

BACKGROUND

In the existing display technologies, a display device must have the characteristic of a wide viewing angle when displaying a picture, and thus multiple users can view the same display device at the same time. However, the characteristic of a wide viewing angle of the display device may sometimes result in leaking the users' privacy. Therefore, some existing display products require a peep-proof function.

In the current touch display technologies, there is also a tendency to integrate a touch system and a display system into one device, for example, an in-cell touch display panel, to provide both touch control and display functions by means of carrying out touch sensing and updating display frames in a time-sharing manner. To achieve the peep-proof function, however, when the in-cell touch display panel is in the display mode, the display frame has the characteristic of a narrow viewing angle through voltage control. When the touch display panel is in the touch mode, a common electrode in the touch display panel is provided with a voltage or signal required for touch sensing. The voltage or signal provided to the common electrode in turn affects the arrangement of the display medium in the display panel, making the display frame unable to maintain the characteristic of a narrow viewing angle. Further, the electric field effect produced by the common electrode may also cause non-uniformity of the display frame.

SUMMARY

The present disclosure provides a touch display panel and a control method thereof, such that when the touch display panel is in a touch sensing mode, a display frame can maintain the characteristic of a narrow viewing angle and the uniformity of the display frame may also be improved.

The touch display panel disclosed by the present disclosure includes a first substrate, a second substrate, a display medium layer, a first common electrode, and a pixel structure. The second substrate and the first substrate are disposed opposite to each other. The display medium layer is disposed between the first substrate and the second substrate. The first common electrode is disposed between the first substrate and the display medium layer. The pixel structure has a pixel electrode and a second common electrode. The pixel structure is disposed between the display medium layer and the second substrate. The first common electrode has a voltage signal. The touch display panel alternately executes a display mode and a touch mode. In the display mode, the pixel electrode is provided with a data signal, a first voltage difference exists between the first common electrode and the second common electrode, and the arrangement of the display medium layer varies according to the data signal and the first voltage difference. In the touch mode, the second common electrode is provided with an indication signal for driving the second common electrode, such that the second common electrode carries out touch sensing. The waveform of the indication signal alternates between a first voltage value and a second voltage value. When the indication signal is at the first voltage value, a second voltage difference exists between the first common electrode and the second common electrode. When the indication signal is at the second voltage value, a third voltage difference exists between the first common electrode and the second common electrode.

A method for controlling the touch display panel disclosed by the present disclosure is applicable to a touch display panel. The touch display panel includes a first substrate, a second substrate, a display medium layer, a first common electrode, and a pixel structure. The display medium layer is disposed between the first substrate and the second substrate, and the first common electrode is disposed between the first substrate and the display medium layer. The pixel structure has a pixel electrode and a second common electrode, and is disposed between the display medium layer and the second substrate. The method for controlling the touch display panel includes the following steps. The touch display panel alternately executes a display mode and a touch mode. In the display mode, the pixel electrode is provided with a data signal, the first common electrode has a voltage signal, and a first voltage difference exists between the first common electrode and the second common electrode. The arrangement of the display medium layer varies according to the data signal and the first voltage difference. In the touch mode, the second common electrode is provided with an indication signal for driving the second common electrode, such that the second common electrode carries out touch sensing. The waveform of the indication signal alternates between a first voltage value and a second voltage value, and the first common electrode has the voltage signal. When the waveform of the indication signal is at the first voltage value, a second voltage difference exists between the first common electrode and the second common electrode. When the waveform of the indication signal is at the second voltage value, a third voltage difference exists between the first common electrode and the second common electrode.

According to the touch display panel and the control method thereof disclosed by the present disclosure, when the touch display panel is in the touch mode, the indication signal provided to the second common electrode alternates between the first voltage value and the second voltage value, and a second voltage difference and a third voltage difference exist between the voltage on the first common electrode and the voltage on the second common electrode, such that the display frame of the touch display panel can maintain the characteristic of a narrow viewing angle, and the uniformity of the display frame is improved.

The above description of the content of the present disclosure and the following illustration of the embodiments are intended to demonstrate and explain the spirit and principle of the present disclosure and to provide further explanations of the claims of the present disclosure.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The following detailed description describes in detail the characteristics and advantages of the instant disclosure, whose content is sufficient to enable any person skilled in the relevant art to understand the technical content of the instant disclosure and implement accordingly, and according to the content, the claims and figures disclosed by the present specification, any person skilled in the relevant art can easily understand the purpose and advantages of the instant disclosure. The following embodiments further illustrate the aspects of the present disclosure, but they do not limit the scope of the present disclosure.

Figure 1:
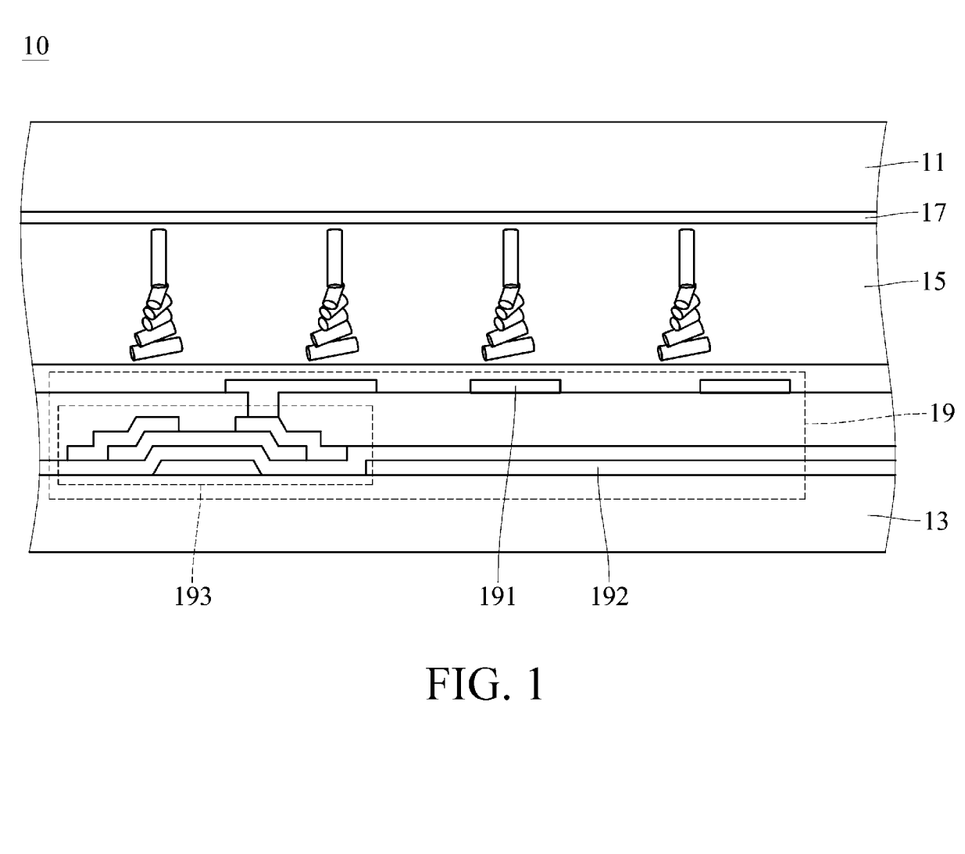
FIG. 1 is a side cross-sectional view of a touch display panel according to an embodiment of the present disclosure.

Referring to FIG. 1, FIG. 1 is a side cross-sectional view of a touch display panel according to an embodiment of the present disclosure. As shown in FIG. 1, a touch display panel 10 includes a first substrate 11, a second substrate 13, a display medium layer 15, a first common electrode 17, and a pixel structure 19. For ease of demonstration and description, only one pixel structure 19 is provided in the figure for illustration, and in practice, a plurality of pixel structures 19 is provided. The present embodiment is not limited to the above structure, and other structures may exist between the first substrate 11 and the second substrate 13.

In the present embodiment, the first substrate 11 and the second substrate 13 are disposed opposite to each other. The display medium layer 15 is disposed between the first substrate 11 and the second substrate 13. The first common electrode 17 is disposed between the first substrate 11 and the display medium layer 15. The pixel structure 19 is disposed between the display medium layer 15 and the second substrate 13. The pixel structure 19 has a pixel electrode 191, a second common electrode 192, and an active element 193. In the present embodiment, the second common electrode 192 is disposed between the second substrate 13 and the pixel electrode 191. The first common electrode 17 and the second common electrode 192 may be of a single-layer or multilayer structure, for example, made of indium tin oxide (ITO), indium zinc oxide (IZO), aluminum zinc oxide, indium oxide, gallium oxide or other suitable conductive materials. The display medium layer 15 is made of, for example, liquid crystal molecules, electrophoresis display medium or other suitable media, and the present embodiment is not limited thereto.

In the present embodiment, the touch display panel 10 continuously alternately executes a display mode and a touch mode in a time-sharing manner. In the display mode, the pixel electrode 19 is provided with a data signal, the first common electrode 17 is provided with an adjustment signal, the second common electrode 192 is provided with an indication signal, such that a first voltage difference exists between the first common electrode 17 and the second common electrode 192. The arrangement of the display medium layer 15 varies according to the data signal and the first voltage difference. Specifically, when the pixel electrode 19 is provided with a data signal and the voltage difference between the first common electrode 17 and the second common electrode 192 is zero, the arrangement of the display medium layer 15 varies according to the voltage of the data signal, and thereby a display frame of the touch display panel is updated. That is to say, when the voltage difference between the first common electrode 17 and the second common electrode 192 is zero, the display frame has the characteristic of a wide viewing angle. When a first voltage difference exists between the first common electrode 17 and the second common electrode 192, a medium in the display medium layer 15 is obliquely arranged at a specific angle, such that the viewing angle of the display frame is narrowed, and the display frame has the characteristic of a narrow viewing angle.

In the touch mode, the waveform of the indication signal alternates between a first voltage value and a second voltage value, and the adjustment signal also alternates between a third voltage value and a fourth voltage value in accordance with the waveform of the indication signal. The waveform of the indication signal alternates between the first voltage value and the second voltage value for driving the second common electrode 192, such that the second common electrode 192 carries out touch sensing. When the indication signal is at the first voltage value, the adjustment signal provided to the first common electrode 17 is at the third voltage value, such that a second voltage difference exists between the first common electrode 17 and the second common electrode 192. When the indication signal is at the second voltage value, the adjustment signal provided to the first common electrode 17 is at the fourth voltage value, and a third voltage difference exists between the first common electrode 17 and the second common electrode 192. Therefore, in the touch mode, when the voltage on the second common electrode 192 alternates, a voltage difference exists between the first common electrode 17 and the second common electrode 192, such that the arrangement of the display medium layer 15 can vary according to the data signal and the voltage difference between the first common electrode 17 and the second common electrode 192, and the display frame has the characteristic of a narrow viewing angle in the touch mode.

Figure 2:
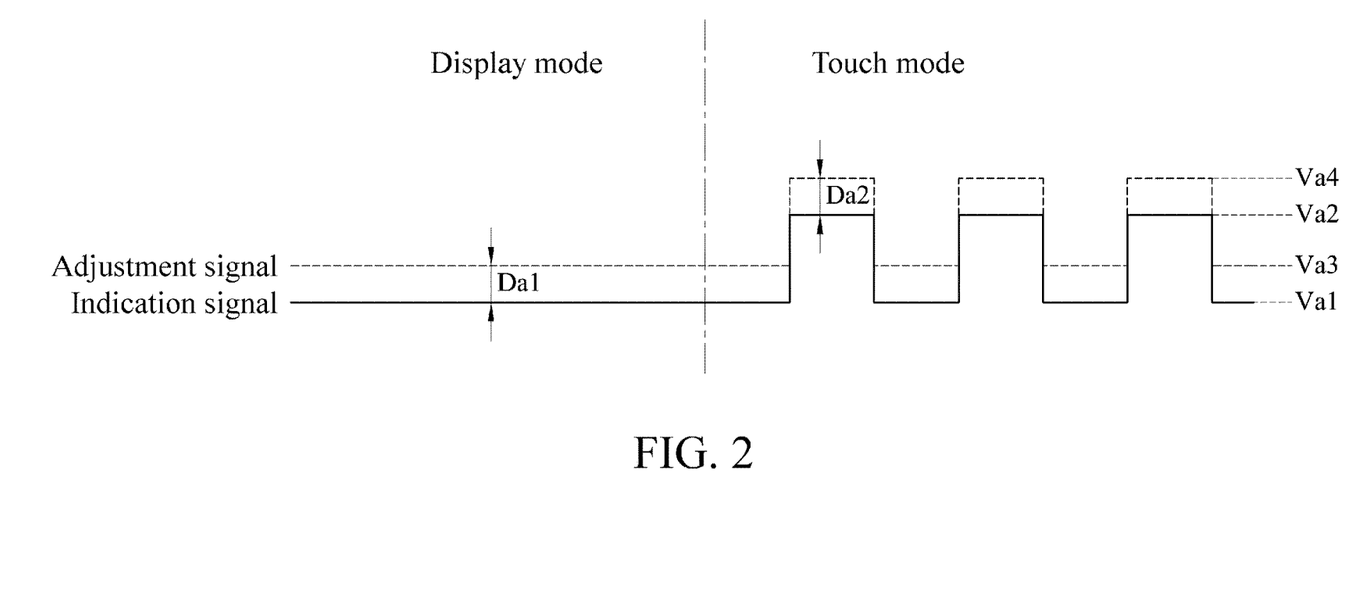
FIG. 2 is a voltage sequence diagram of an adjustment signal and an indication signal according to an embodiment of the present disclosure.

In an embodiment, referring to FIG. 1 and FIG. 2, FIG. 2 is a voltage sequence diagram of an adjustment signal and an indication signal according to an embodiment of the present disclosure. As shown in the figures, in the display mode, the voltage level of the indication signal provided to the second common electrode 192 has a first voltage value Va1, and the first voltage value Va1 is a constant voltage value. The voltage level of the adjustment signal provided to the first common electrode 17 has a third voltage value Va3, and the third voltage value Va3 is also a constant voltage value in accordance with the indication signal. The display frame of the touch display panel in the display mode has the characteristic of a narrow viewing angle due to the first voltage difference Da1 between the first voltage value Va1 and the third voltage value Va3.

In the touch mode, the indication signal provided to the second common electrode 192 alternates between the first voltage value Va1 and the second voltage value Va2, and the voltage level of the adjustment signal provided to the first common electrode 17 also alternates between the third voltage value Va3 and the fourth voltage value Va4 in accordance with the indication signal, where the third voltage value Va3 is in a range between the first voltage value Va1 and the second voltage value Va2, and the third voltage value Va3 is larger than the first voltage value Va1. The second voltage value Va2 is in a range between the third voltage value Va3 and the fourth voltage value Va4. When the indication signal is at the second voltage value Va2 and the adjustment signal is at the fourth voltage value Va4, a second voltage difference Da2 exists between the first common electrode 17 and the second common electrode 192. In the present embodiment, the first voltage difference Da1 and the second voltage difference Da2 are not limited to being equal or unequal. By providing an adjustment signal to the first common electrode 17, a voltage difference is maintained between the first common electrode 17 and the second common electrode 192 in the touch mode, such that the arrangement of the display medium layer 15 varies according to the data signal and the voltage difference between the first common electrode 17 and the second common electrode 192, and the characteristic of a narrow viewing angle is maintained.

Figure 3:
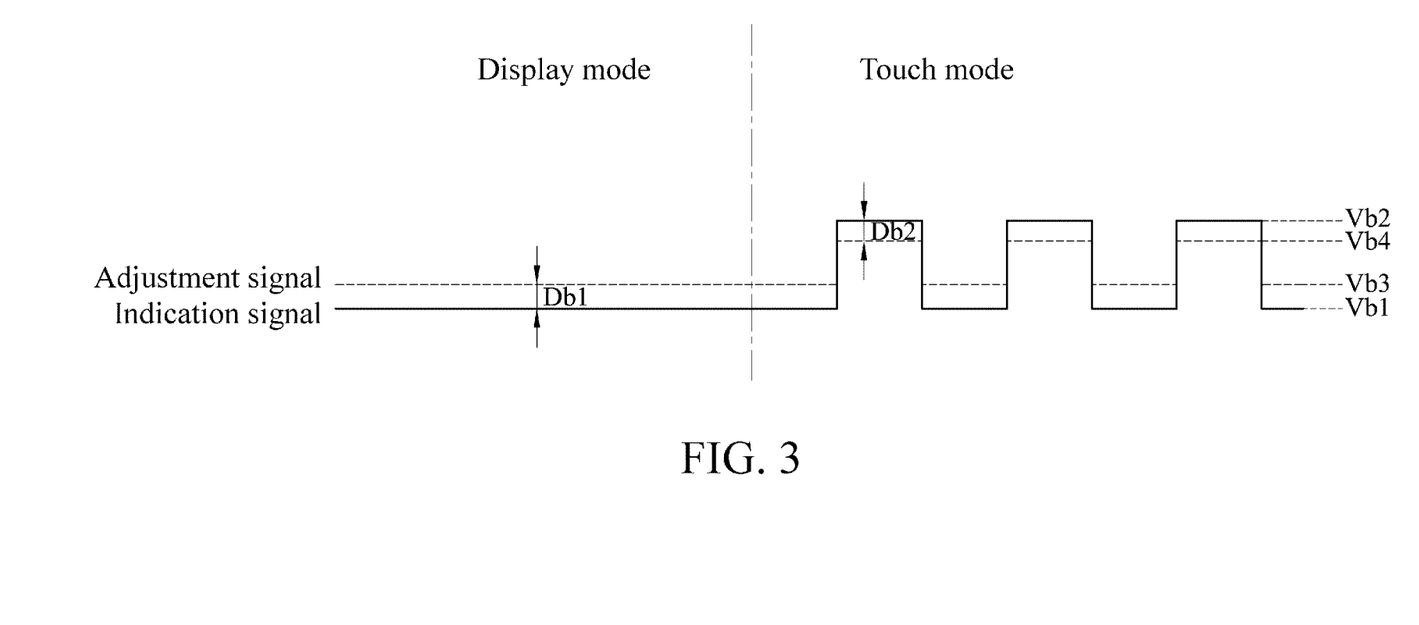
FIG. 3 is a voltage sequence diagram of an adjustment signal and an indication signal according to another embodiment of the present disclosure.

In another embodiment, referring to FIG. 1 and FIG. 3, FIG. 3 is a voltage sequence diagram of the adjustment signal and the indication signal according to another embodiment of the present disclosure. As shown in the figures, in the display mode, the voltage level of the indication signal provided to the second common electrode 192 has a first voltage value Vb1, and the first voltage value Vb1 is a constant voltage value. The voltage level of the adjustment signal provided to the first common electrode 17 has a third voltage value Vb3, and the third voltage value Vb3 is also a constant voltage value in accordance with the indication signal. The display frame of the touch display panel in the display mode has the characteristic of a narrow viewing angle due to the first voltage difference Db1 between the first voltage value Vb1 and the third voltage value Vb3.

In the touch mode, the indication signal provided to the second common electrode 192 alternates between the first voltage value Vb1 and the second voltage value Vb2, the voltage level of the adjustment signal provided to the first common electrode 17 also alternates between the third voltage value Vb3 and the fourth voltage value Vb4 in accordance with the indication signal, wherein the third voltage value Vb3 and the fourth voltage value Vb4 are in a range between the first voltage value Vb1 and the second voltage value Vb2. When the indication signal is at the second voltage value Vb2 and the adjustment signal is at the fourth voltage value Vb4, a second voltage difference Db2 exists between the first common electrode 17 and the second common electrode 192. In the present embodiment, the first voltage difference Db1 may be equal to the second voltage difference Db2 but not limited thereto. Therefore, a voltage difference exists between the first common electrode 17 and the second common electrode 192 in the touch mode, such that the arrangement of the display medium layer 15 can vary according to the data signal and the voltage difference between the first common electrode 17 and the second common electrode 192, and the characteristic of a narrow viewing angle is also maintained in the touch mode.

Figure 4:
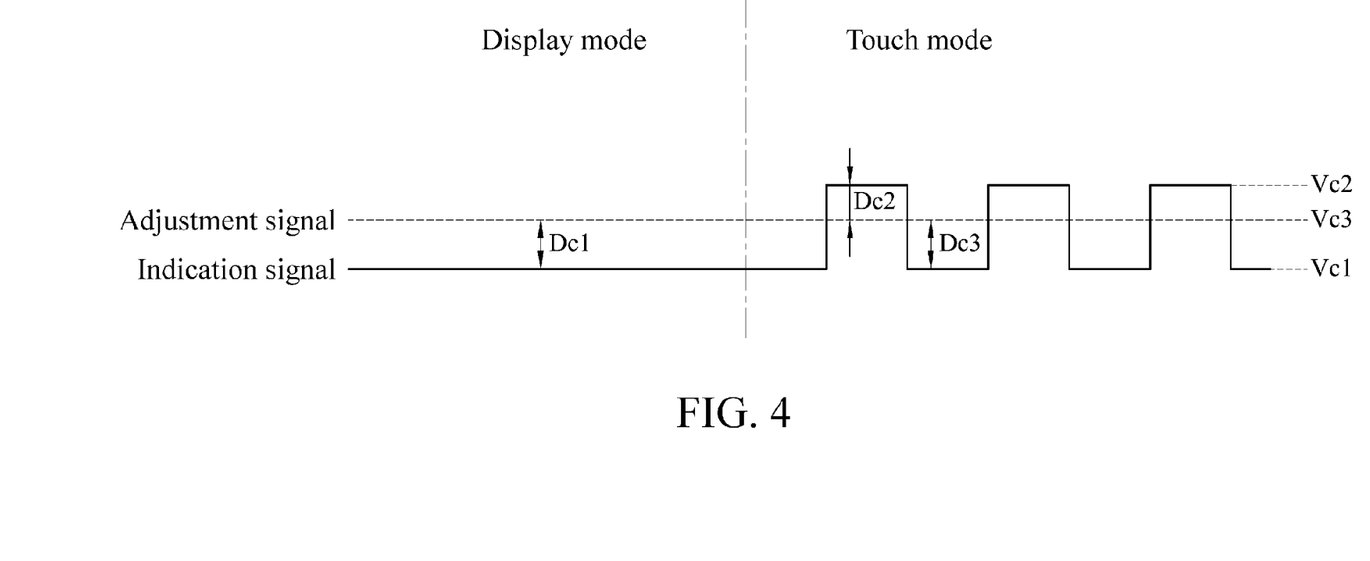
FIG. 4 is a voltage sequence diagram of an adjustment signal and an indication signal according to yet another embodiment of the present disclosure.

In yet another embodiment, referring to FIG. 1 and FIG. 4, FIG. 4 is a voltage sequence diagram of the adjustment signal and the indication signal according to yet another embodiment of the present disclosure. As shown in the figures, in the display mode, the voltage level of the indication signal provided to the second common electrode 192 has a first voltage value Vc1, and the first voltage value Vc1 is a constant voltage value. The voltage level of the adjustment signal provided to the first common electrode 17 has a third voltage value Vc3, and the third voltage value Vc3 is also a constant voltage value. The display frame of the touch display panel in the display mode has the characteristic of a narrow viewing angle due to the first voltage difference Dc1 between the first voltage value Vc1 and the third voltage value Vc3.

In the touch mode, the indication signal provided to the second common electrode 192 alternates between the first voltage value Vc1 and the second voltage value Vc2, the adjustment signal having a constant voltage is provided to the first common electrode 17, and the voltage level of the adjustment signal has a third voltage value Vc3. The third voltage value Vc3 is in a range between the first voltage value Vc1 and the second voltage value Vc2. When the indication signal is at the second voltage value Vc2, a second voltage difference Dc2 exists between the first common electrode 17 and the second common electrode 192. When the indication signal is at the first voltage value Vc1, a third voltage difference Dc3 exists between the first common electrode 17 and the second common electrode 192. The third voltage difference Dc3 is substantially equal to the first voltage difference Dc1 between the first common electrode 17 and the second common electrode 192 in the display mode.

In the other embodiments, the third voltage value Vc3 is, for example, but not limited to, an average value of the first voltage Vc1 and the second voltage value Vc2. By providing an adjustment signal to the first common electrode 17, a voltage difference is maintained between the first common electrode 17 and the second common electrode 192 in the touch mode, such that the arrangement of the display medium layer 15 varies according to the data signal and the voltage difference between the first common electrode 17 and the second common electrode 192, and the characteristic of a narrow viewing angle is maintained.

Figure 5:
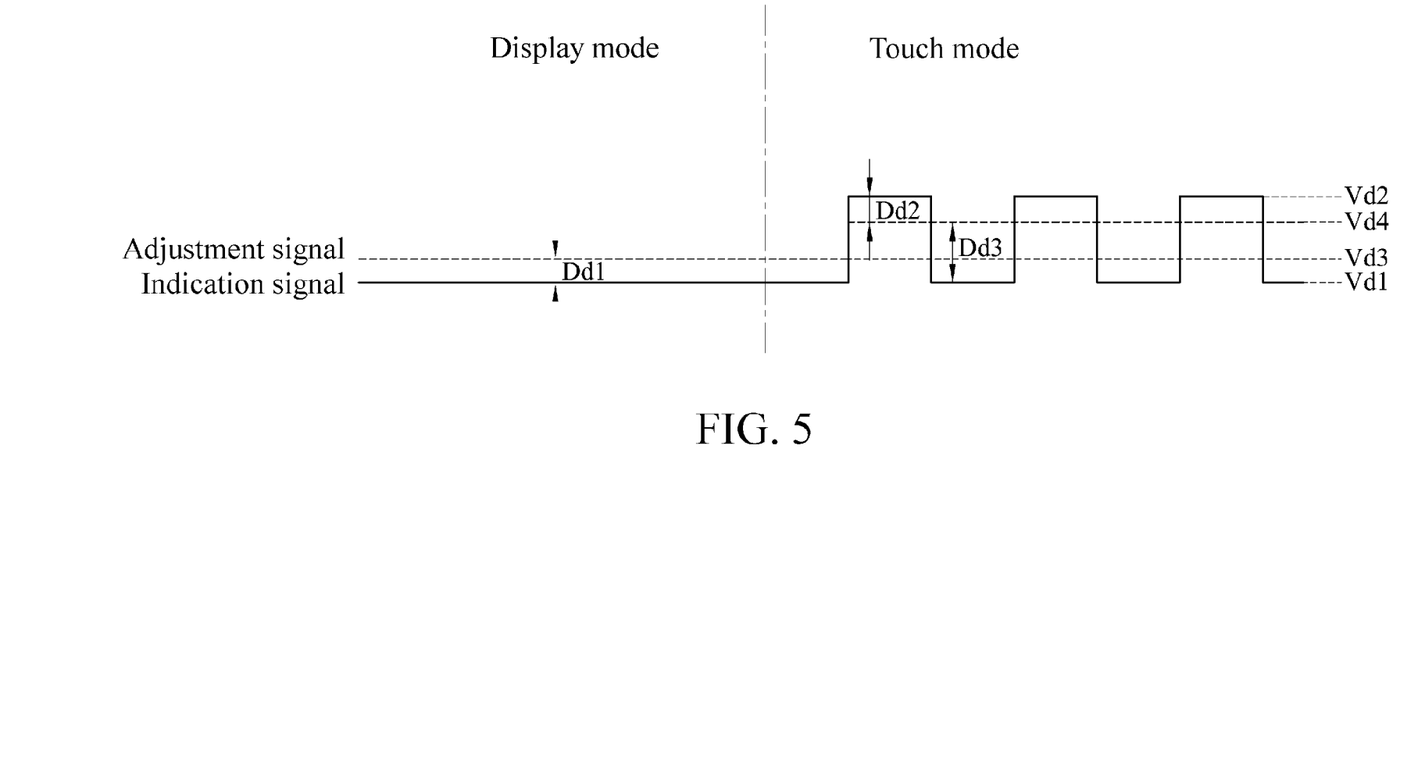
FIG. 5 is a voltage sequence diagram of an adjustment signal and an indication signal according to still another embodiment of the present disclosure.

In still another embodiment, referring to FIG. 1 and FIG. 5, FIG. 5 is a voltage sequence diagram of the adjustment signal and the indication signal according to yet another embodiment of the present disclosure. As shown in the figures, in the display mode, the voltage level of the indication signal provided to the second common electrode 192 has a first voltage value Vd1, and the first voltage value Vd1 is a constant voltage value. The voltage level of the adjustment signal provided to the first common electrode 17 has a third voltage value Vd3, and the third voltage value Vd3 is also a constant voltage value. The display frame of the touch display panel in the display mode has the characteristic of a narrow viewing angle due to the first voltage difference Dd1 between the first voltage value Vd1 and the third voltage value Vd3.

In the touch mode, the indication signal provided to the second common electrode 192 alternates between the first voltage value Vd1 and the second voltage value Vd2, the voltage level of the adjustment signal provided to the first common electrode 17 has a fourth voltage value Vd4, the fourth voltage value Vd4 is also a constant voltage value, and the third voltage value Vd3 and the fourth voltage value Vd4 are in a range between the first voltage value Vd1 and the second voltage value Vd2. When the indication signal is at the second voltage value Vd2, a second voltage difference Dd2 exists between the first common electrode 17 and the second common electrode 192. When the indication signal is at the first voltage value Vd1, a third voltage difference Dd3 exists between the first common electrode 17 and the second common electrode 192.

In the present embodiment, the third voltage difference Dd3 of the adjustment signal in the display mode is smaller than the fourth voltage value Vd4, and the second voltage difference Dd2 is smaller than the third voltage difference Dd3. In the other embodiments, when the third voltage difference Dd3 of the adjustment signal in the display mode is larger than the fourth voltage value Vd4, the second voltage difference Dd2 is larger than the third voltage difference Dd3. Therefore, a voltage difference exists between the first common electrode 17 and the second common electrode 192 in both the display mode and the touch mode, such that the arrangement of the display medium layer 15 can vary according to the data signal and the voltage difference between the first common electrode 17 and the second common electrode 192. The display frame also maintains the characteristic of a narrow viewing angle in the touch mode.

In the above embodiments, the first common electrode 17 is provided with the adjustment signal and has the voltage signal. In the other embodiments, the voltage signal on the first common electrode 17 may be, for example, a voltage signal of the first common electrode 17 influenced by the voltage on the second common electrode 192 or the voltage on the other electrodes when the first common electrode 17 is floating.

The adjustment signal and the indication signal are, for example, provided by a processor of the touch display panel 10. In an ideal state, when the first common electrode 17 is provided with the adjustment signal, the voltage signal on the first common electrode 17 equals the adjustment signal, and when the second common electrode 192 is provided with the indication signal, the voltage signal on the second common electrode 192 equals the indication signal. In practice, when the adjustment signal and the indication signal are respectively applied to the first common electrode 17 and the second common electrode 192, the voltage on the first common electrode 17 and the voltage on the second common electrode 192 are respectively unequal to the voltage level of the adjustment signal and the voltage level of the indication signal in some degree. However, for ease of description in the above embodiments, the voltage difference between the adjustment signal and the indication signal is used to illustrate the voltage difference between the first common electrode 17 and the second common electrode 192, and the voltage difference between the adjustment signal and the indication signal is actually unequal to the voltage difference between the first common electrode 17 and the second common electrode 192. Persons of ordinary skill in the art can understand from the above description that the voltage on the first common electrode 17 and the voltage on the second common electrode 192 actually alternate according to the voltage of the adjustment signal and the voltage of the indication signal, and the details are not repeated herein.

Figure 6:
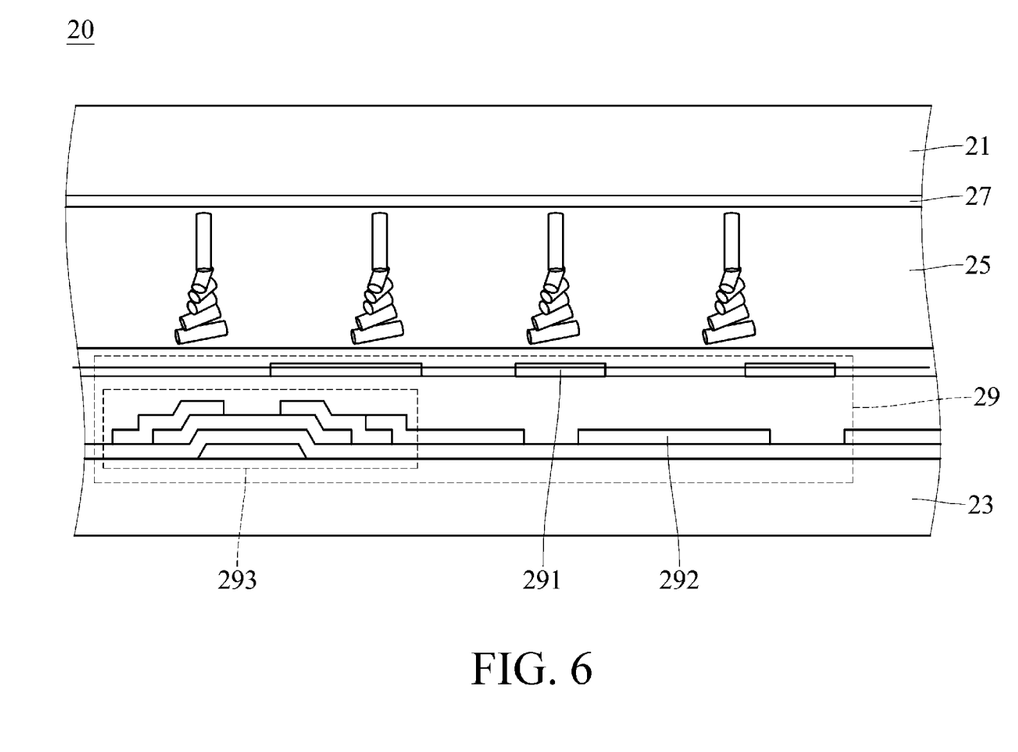
FIG. 6 is a side cross-sectional view of a touch display panel according to another embodiment of the present disclosure.
Figure 7:
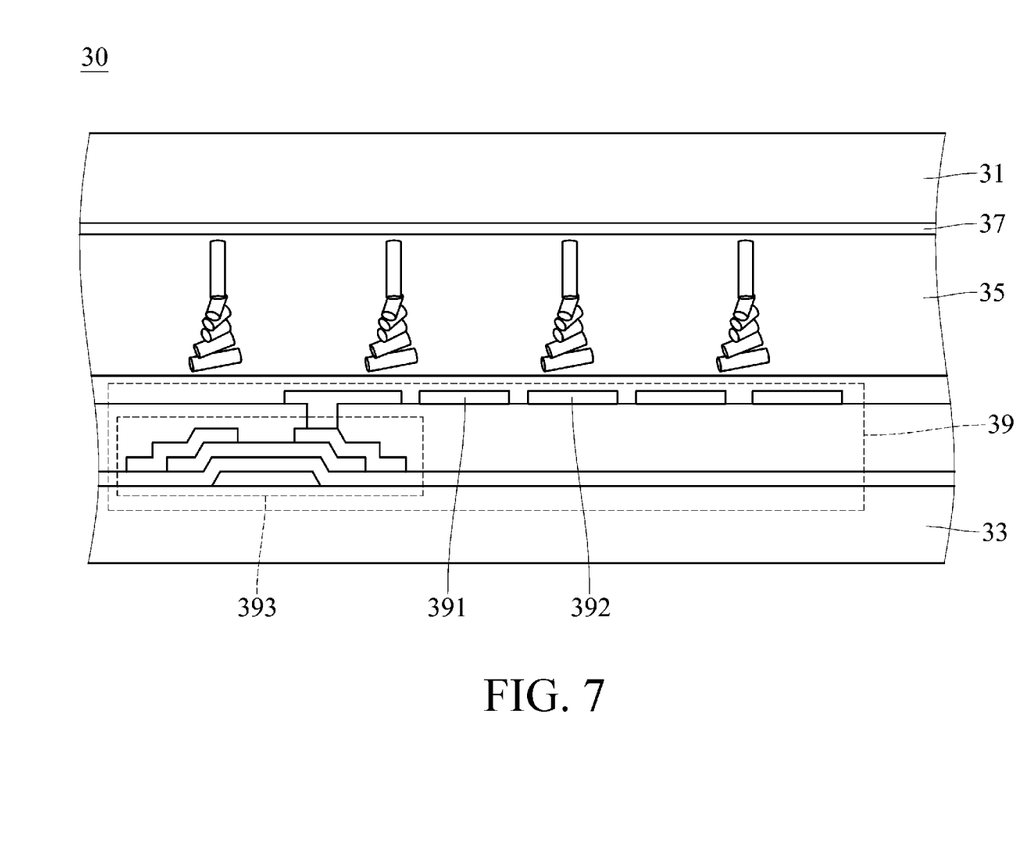
FIG. 7 is a side cross-sectional view of a touch display panel according to yet another embodiment of the present disclosure.

In the above embodiments, the second common electrode 192 is disposed between the second substrate 13 and the pixel electrode 191, and in the other embodiments, the second common electrode 192 may also be disposed at other positions. Referring to FIG. 6 and FIG. 7, FIG. 6 is a side cross-sectional view of a touch display panel according to another embodiment of the present disclosure, and FIG. 7 is a side cross-sectional view of a touch display panel according to yet another embodiment of the present disclosure. Referring to FIG. 6, the touch display panel 20 includes a first substrate 21, a second substrate 23, a display medium layer 25, a first common electrode 27, and a pixel structure 29, wherein the first substrate 21 and the second substrate 23 are disposed opposite to each other. The display medium layer 25 is disposed between the first substrate 21 and the second substrate 23. The first common electrode 27 is disposed between the first substrate 21 and the display medium layer 25. The pixel structure 29 includes a pixel electrode 291, a second common electrode 292, and an active element 293, where the second common electrode 292 is disposed between the pixel electrode 291 and the second substrate 23.

A voltage difference exists between the first common electrode 27 and the second common electrode 292 when the touch display panel 20 is in the display mode and the touch mode, such that the arrangement of the display medium layer 25 can vary according to the data signal and the voltage difference between the first common electrode 27 and the second common electrode 292, and the display frame has the characteristic of a narrow viewing angle in both the display mode and the touch mode.

As shown in FIG. 7, the touch display panel 30 includes a first substrate 31, a second substrate 33, a display medium layer 35, a first common electrode 37, and a pixel structure 39, wherein the first substrate 31, the second substrate 33, the display medium layer 35, and the first common electrode 37 are generally the same as those in the previous embodiment, and the details are not repeated herein. Different from the previous embodiment, the second common electrode 392 and the pixel electrode 391 of the pixel structure 39 are disposed in the same plane, and are located between the display medium layer 35 and the second substrate 33.

Figure 8:
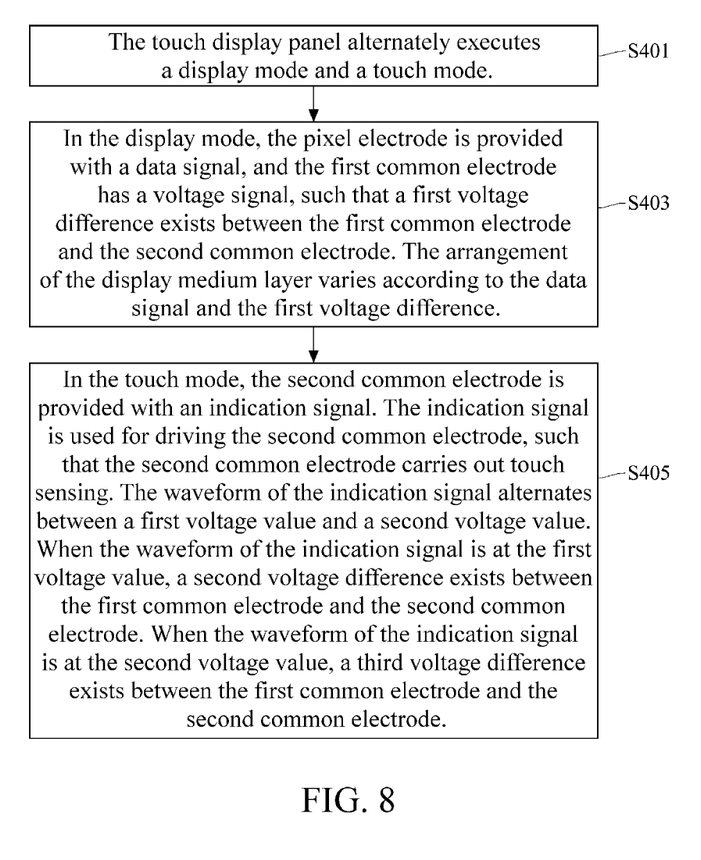
FIG. 8 is a flow chart of a method for controlling a touch display panel according to an embodiment of the present disclosure.

To illustrate the method for controlling the touch display panel more clearly, please refer to both FIG. 1 and FIG. 8. FIG. 8 is a flow chart of a method for controlling a touch display panel according to an embodiment of the present disclosure. As shown in the figures, in Step S401, the touch display panel 10 alternately executes a display mode and a touch mode. In Step S403, in the display mode, the pixel electrode 191 is provided with a data signal, and the first common electrode 17 has a voltage signal, such that a first voltage difference exists between the first common electrode 17 and the second common electrode 192. The arrangement of the display medium layer 15 varies according to the data signal and the first voltage difference.

In Step S405, in the touch mode, the second common electrode 192 is provided with an indication signal. The indication signal is used for driving the second common electrode 192, such that the second common electrode 192 carries out touch sensing. The waveform of the indication signal alternates between a first voltage value and a second voltage value. When the waveform of the indication signal is at the first voltage value, a second voltage difference exists between the first common electrode 17 and the second common electrode 192. When the waveform of the indication signal is at the second voltage value, a third voltage difference exists between the first common electrode 17 and the second common electrode 192. The method for controlling the touch display panel according to the present disclosure has been illustrated in the above embodiments, and the details are not repeated herein.

In view of the above, the embodiments of the present disclosure provide a touch display panel and a control method thereof. In accordance with the indication signal provided to the second common electrode, the adjustment signal is thereby provided to the first common electrode or makes the first common electrode floating, and thus in the touch mode, a second voltage difference and a third voltage difference exist between the first common electrode and the second common electrode, such that the display frame of the touch display panel can maintain the characteristic of a narrow viewing angle, the touch display panel has the peep-proof function, and the uniformity of the display frame is improved.

While the present disclosure has been disclosed with the above embodiments, these embodiments are not intended to limit the present disclosure. All alterations and modifications fall within the protection scope of the present disclosure, without departing from the essences and scope of the present disclosure. Regarding the scope of patent protection defined by the present disclosure, please refer to the appended claims.

What is claimed is:

1. A touch display panel, comprising:
   a first substrate;
   a second substrate, disposed opposite to the first substrate;
   a display medium layer, disposed between the first substrate and the second substrate;
   a first common electrode, disposed between the first substrate and the display medium layer; and
   a pixel structure, having a pixel electrode and a second common electrode,
   wherein the pixel structure is disposed between the display medium layer and the second substrate, the first common electrode has a voltage signal, the second common electrode is provided with an indication signal, and the touch display panel alternately executes a display mode and a touch mode;
   wherein in the display mode, the pixel electrode is provided with a data signal, a first voltage difference exists between the first common electrode and the second common electrode, and an arrangement of the display medium layer varies according to the data signal and the first voltage difference; in the touch mode, the second common electrode is provided with the indication signal for driving the second common electrode, such that the second common electrode carries out touch sensing; a waveform of the indication signal alternates between a first voltage value and a second voltage value; when the indication signal is at the first voltage value, a second voltage difference exists between the first common electrode and the second common electrode; and when the indication signal is at the second voltage value, a third voltage difference exists between the first common electrode and the second common electrode;
   wherein the first common electrode is provided with an adjustment signal, such that the first common electrode has the voltage signal; and
   wherein in the touch mode, the adjustment signal alternates between a third voltage value and a fourth voltage value, and when the indication signal is at the first voltage value, the adjustment signal is at the third voltage value; when the indication signal is at the second voltage value, the adjustment signal is at the fourth voltage value; the second voltage difference between the first common electrode and the second common electrode is substantially equal to the third voltage difference.

2. The touch display panel according to claim 1, wherein the third voltage value is larger than the first voltage value, and the fourth voltage value is larger than the second voltage value.

3. The touch display panel according to claim 1, wherein the third voltage value and the fourth voltage value are in a range between the first voltage value and the second voltage value.

4. The touch display panel according to claim 1, wherein in the touch mode, a voltage level of the adjustment signal provided to the first common electrode has a constant voltage value, and the constant voltage value is in a range between the first voltage value and the second voltage value.

5. The touch display panel according to claim 4, wherein a difference between the constant voltage value and the first voltage value is substantially equal to a difference between the constant voltage value and the second voltage value.

6. The touch display panel according to claim 1, wherein in the display mode, a voltage level of the indication signal has the first voltage value, and the first voltage difference between the first common electrode and the second common electrode is substantially equal to the second voltage difference.

7. A method for controlling a touch display panel, applicable to a touch display panel comprising a first substrate, a second substrate, a display medium layer, a first common electrode and a pixel structure, with the display medium layer disposed between the first substrate and the second substrate, the first common electrode disposed between the first substrate and the display medium layer, and the pixel structure having a pixel electrode and a second common electrode disposed between the display medium layer and the second substrate, the method for controlling the touch display panel comprising:
   alternately executing, by the touch display panel, a display mode and a touch mode;
   in the display mode, providing a data signal to the pixel electrode, and providing an adjustment signal to the first common electrode, such that the first common electrode has a voltage signal, a first voltage difference exists between the first common electrode and the second common electrode, and an arrangement of the display medium layer varies according to the data signal and the first voltage difference; and
   in the touch mode, providing an indication signal to the second common electrode for driving the second common electrode, such that the second common electrode carries out touch sensing, wherein the indication signal alternates between a first voltage value and a second voltage value, and the first common electrode has the voltage signal; when the indication signal is at the first voltage value, a second voltage difference exists between the first common electrode and the second common electrode; when the indication signal is at the second voltage value, a third voltage difference exists between the first common electrode and the second common electrode;

wherein in the touch mode, a waveform of the adjustment signal alternates between a third voltage value and a fourth voltage value; when the indication signal is at the first voltage value, the adjustment signal is at the third voltage value; when the indication signal is at the second voltage value, the adjustment signal is at the fourth voltage value; when a difference between the first voltage value and the third voltage value is substantially equal to a difference between the second voltage value and the fourth voltage value, the second voltage difference between the first common electrode and the second common electrode is substantially equal to the third voltage difference.

* * * * *